United States Patent
Park et al.

(10) Patent No.: US 8,995,353 B2
(45) Date of Patent: Mar. 31, 2015

(54) METHOD AND APPARATUS FOR TRANSMITTING BROADCAST DATA AND METHOD AND APPARATUS FOR RECEIVING BROADCAST DATA

(75) Inventors: Sung-il Park, Suwon-si (KR); Ga-hyun Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 12/248,407

(22) Filed: Oct. 9, 2008

(65) Prior Publication Data

US 2009/0092092 A1 Apr. 9, 2009

Related U.S. Application Data

(60) Provisional application No. 60/978,488, filed on Oct. 9, 2007.

(30) Foreign Application Priority Data

Jan. 10, 2008 (KR) .................. 10-2008-0002954

(51) Int. Cl.
*H04W 4/00* (2009.01)
*H04L 12/18* (2006.01)
*H04N 21/2381* (2011.01)
(Continued)

(52) U.S. Cl.
CPC .......... *H04L 12/189* (2013.01); *H04N 21/2353* (2013.01); *H04L 12/18* (2013.01); *H04L 12/1877* (2013.01); *H04N 21/235* (2013.01); *H04N 21/2381* (2013.01);
(Continued)

(58) Field of Classification Search
None
See application file for complete search history.

(56) References Cited

U.S. PATENT DOCUMENTS 5,400,401 A 3/1995 Wasilewski et al.
6,215,530 B1 4/2001 Wasilewski
(Continued)

FOREIGN PATENT DOCUMENTS

CN 1671191 A 9/2005
CN 1929614 A 3/2007
(Continued)

OTHER PUBLICATIONS

Setlur, et al., "A Mobile Open Rich Media Environment", ICME. 2006.26.26.12, Jul. 9, 2006, pp. 2029-2032.
(Continued)

*Primary Examiner* — Khoa Huynh
(74) *Attorney, Agent, or Firm* — Sughrue Mion, PLLC (57) ABSTRACT

Provided are a method and apparatus for transmitting broadcast data and a method and apparatus for receiving broadcast data so as to provide a broadcast service. The method of transmitting broadcast data includes: receiving at least one Internet Protocol (IP) packet group, the IP packet group classified based on a service provided by IP packets; generating first mapping information which indicates mapping information between an IP address corresponding to each of the at least one IP packet and an address within a transmission channel on which each of the at least one IP packet group is to be carried; and transmitting the first mapping information and the at least one IP packet group via the transmission channel. A user accesses only desired IP packets quickly and processes them so that a data processing speed can be improved.

8 Claims, 7 Drawing Sheets

(51) Int. Cl.
  *H04N 21/435* (2011.01)
  *H04N 21/643* (2011.01)
  *H04N 21/84* (2011.01)
  *H04W 72/00* (2009.01)
  *H04N 21/235* (2011.01)

(52) U.S. Cl.
  CPC ...... *H04N 21/435* (2013.01); *H04N 21/64322* (2013.01); *H04N 21/84* (2013.01); *H04W 72/005* (2013.01)
  USPC ......... 370/329; 370/432; 455/452.2; 709/226

(56) References Cited

U.S. PATENT DOCUMENTS

| | | | |
|---|---|---|---|
| 6,598,226 B1 | 7/2003 | Sorensen | |
| 7,477,630 B2 | 1/2009 | Kim et al. | |
| 7,792,121 B2 | 9/2010 | Thompson, III et al. | |
| 7,886,323 B2 | 2/2011 | Park | |
| 2002/0142757 A1 | 10/2002 | Leung et al. | |
| 2002/0146038 A1 | 10/2002 | Casavant et al. | |
| 2002/0167992 A1* | 11/2002 | Das et al. | 375/146 |
| 2003/0063615 A1 | 4/2003 | Luoma et al. | |
| 2004/0103430 A1 | 5/2004 | Lee et al. | |
| 2004/0136352 A1 | 7/2004 | Fu et al. | |
| 2004/0190629 A1 | 9/2004 | Cooper et al. | |
| 2005/0232136 A1 | 10/2005 | Kwak | |
| 2005/0273833 A1 | 12/2005 | Soinio | |
| 2006/0053450 A1 | 3/2006 | Saarikivi et al. | |
| 2006/0067317 A1 | 3/2006 | Engstrand et al. | |
| 2006/0246836 A1 | 11/2006 | Simon | |
| 2006/0294205 A1 | 12/2006 | Aaltonen et al. | |
| 2007/0040937 A1 | 2/2007 | Eum | |
| 2007/0041377 A1 | 2/2007 | Song et al. | |
| 2007/0118586 A1 | 5/2007 | Hwang et al. | |
| 2007/0195809 A1* | 8/2007 | Blanz et al. | 370/426 |
| 2008/0225778 A1* | 9/2008 | Vare et al. | 370/328 |
| 2008/0285556 A1 | 11/2008 | Park et al. | |
| 2009/0052579 A1* | 2/2009 | Lee et al. | 375/301 |
| 2009/0052587 A1* | 2/2009 | Song et al. | 375/340 |
| 2009/0214043 A1 | 8/2009 | Choi et al. | |

FOREIGN PATENT DOCUMENTS

| | | | |
|---|---|---|---|
| EP | 1081866 A3 | 3/2001 | |
| EP | 1710937 A2 * | 10/2006 | |
| JP | 2000069454 A | 3/2000 | |
| JP | 2007-006349 A | 1/2007 | |
| KR | 10-2004-0007588 A | 1/2004 | |
| KR | 10-2004-0036447 A | 4/2004 | |
| KR | 10-2004-0058502 A | 7/2004 | |
| KR | 10-2004-0062893 A | 7/2004 | |
| KR | 10-2005-0056708 A | 6/2005 | |
| KR | 10-0565098 B1 | 3/2006 | |
| KR | 10-2006-0059877 A | 6/2006 | |
| KR | 10-2006-0126056 A | 12/2006 | |
| KR | 10-2007-0021032 A | 2/2007 | |
| KR | 10-2007-0025851 A | 3/2007 | |
| KR | 10-0692903 B1 | 3/2007 | |
| KR | 10-2007-0049042 A | 5/2007 | |
| KR | 10-2008-0100753 A | 11/2008 | |
| KR | 10-2009-0090809 A | 8/2009 | |
| WO | 03/010975 A1 | 2/2003 | |
| WO | 2005/041594 A1 | 5/2005 | |
| WO | 2006/006009 A1 | 1/2006 | |
| WO | 2007/013026 A2 | 2/2007 | |

OTHER PUBLICATIONS

Communication from the Canadian Patent Office in counterpart application No. 2,667,571 issued Apr. 4, 2011.
Communication from the Canadian Patent Office in counterpart application No. 2,666,573 issued Apr. 18, 2011.
Mexican Office Action issued in corresponding Application No. MX/a/2009/004942 on Jun. 2, 2011.
Korean Office Action issued in corresponding Korean Application No. 10-2011-7016426 on Jul. 29, 2011.
Office Action from the State Intellectual Property Office of P.R. China, dated Sep. 15, 2011, issued in corresponding Chinese Application No. 200880001062.7.
Communication dated Nov. 23, 2011 issued by the Korean Intellectual Property Office in counterpart Korean Patent Application No. 10-2009-7016241.
Korean Office Action issued on Jan. 14, 2011 in the corresponding Korean Patent Application No. 10-2009-0097026.
Communication from the Finnish Patent Office issued Mar. 8, 2012 in counterpart Finnish Application No. 20095929.
International Search Report and Written Opinion for PCT/KR2008/002699, dated Sep. 29, 2008.
International Search Report and Written Opinion for PCT/KR2008/003267, dated Dec. 9, 2008.
International Search Report and Written Opinion for PCT/KR2008/002697, dated Nov. 5, 2008.
International Search Report and Written Opinion for PCT/KR2008/001372, dated Jul. 8, 2008.
International Search Report and Written Opinion for PCT/KR2008/002750, dated Sep. 25, 2008.
Communication dated Jul. 2, 2012 from the State Intellectual Property Office of P.R. China in a counterpart application No. 200880001075.4.
Communication from the Canadian Patent Office issued Jul. 5, 2012 in counterpart Canadian Application No. 2702054.
Communication from the Canadian Patent Office issued Jul. 9, 2012 in counterpart Canadian Application No. 2667571.
Communication dated Jan. 5, 2013 issued by the State Intellectual Property Office of P.R. China in counterpart Chinese Patent Application No. 200880001075.4.
"Radio Broadcasting Systems; Digital Audio Broadcasting (DAB) to mobile, portable and fixed receivers", Final Draft ETSI EN 300 401 V1.4.1, European Standard (Telecommunications series), Jan. 31, 2006, pp. 1-197.
Communication dated Jul. 31, 2013, issued by the Korean Intellectual Property Office in counterpart Korean Application No. 10-2007-074642.
Communication dated May 2, 2013 issued by the State Intellectual Property Office of P.R. China in counterpart Chinese Patent Application No. 200880001075.4.
Communication dated May 31, 2013 issued by the Canadian Intellectual Property Office in counterpart Canadian Patent Application No. 2 702 054.
Communication dated Jul. 10, 2013 issued by the Korean Intellectual Property Office in counterpart Korean Patent Application No. 10-2010-0108395.
Communication dated Jul. 10, 2013 issued by the Korean Intellectual Property Office in counterpart Korean Patent Application No. 10-2010-0108396.
Communication dated Jul. 10, 2013 issued by the Korean Intellectual Property Office in counterpart Korean Patent Application No. 10-2010-0108397.
Communication, dated Nov. 6, 2013, issued by the Finnish Patent and Registration Office in counterpart Finnish Patent Application No. 20095927.
Communication, dated Jan. 16, 2014, issued by the Finnish Patent and Registration Office in counterpart Finnish Patent Application No. 20105338.
Communication, dated Dec. 17, 2013, issued by the Korean Intellectual Property Office in counterpart Korean Patent Application No. 10-2007-0124371.
Communication, dated Dec. 17, 2013, issued by the Canadian Intellectual Property Office in counterpart Canadian Patent Application No. 2,667,571.
Communication, dated Feb. 19, 2014, issued by the Korean Intellectual Property Office in counterpart Korean Patent Application No. 10-2008-0002954.
Communication, dated Feb. 25, 2014, issued by the Finnish Patent and Registration Office in counterpart Finnish Patent Application No. 20095927.

(56) References Cited

OTHER PUBLICATIONS

Communication dated May 26, 2014, issued by the Canadian Intellectual Property Office in counterpart Canadian Application No. 2,702,054.

Communication, Issued by the Canadian Intellectual Property Office, Dated Dec. 18, 2014, In counterpart Canadian Application No. 2 702 054.

* cited by examiner

```
Syntax                                              # of bits
  IP_mapping_table()
  {
    extended_version                                 1
    number_of_channel                                7
    for(i=0;i<number_of_channel ; i++)
    {
      reference_ch_flag                              1
      reserved                                       2
      turbo_channel_id                               5
      reserved                                       3
      LMT_Index_number                               5
      number_of_IP_ch_descriptor                     8
      for(i = 0 ; i < number_of_IP_ch_descriptor ; i ++)
      {
        IP_channel_description()                     8*N
      }
    }
  }
```

METHOD AND APPARATUS FOR TRANSMITTING BROADCAST DATA AND METHOD AND APPARATUS FOR RECEIVING BROADCAST DATA

CROSS-REFERENCE TO RELATED PATENT APPLICATIONS

This application claims the benefit of U.S. Provisional Application No. 60/978,488, filed on Oct. 9, 2007, in the United States Patent and Trademark Office, and Korean Patent Application No. 10-2008-0002954, filed on Jan. 10, 2008, in the Korean Intellectual Property Office, the disclosures of which are incorporated herein in its entirety by reference.

BACKGROUND OF THE INVENTION

1. Field of the Invention

The present invention relates to a method and apparatus for transmitting broadcast data and a method and apparatus for receiving broadcast data, and more particularly, to a method and apparatus for transmitting broadcast data and a method and apparatus for receiving broadcast data so as to provide a broadcast service according to the Open Mobile Alliance-BroadCAST (OMA-BCAST) standard.

2. Description of the Related Art

Recently, digital broadcasting that provides various additional data services such as weather, traffic, entertainment, and images etc., as well as high-quality audio services corresponding to the sound quality of a compact disc (CD) have become widely popular. In particular, a broadcasting technology in which digital broadcasting is used with a mobile device has been spotlighted.

An 8-level Vestigial SideBand (VSB) transmission system for digital broadcasting is defined in the Advanced Television System Committee (ATSC) standard, and an Advanced-Vestigial SideBand (A-VSB) system is used as a more developed format of 8-VSB. In the 8-VSB transmission system, 8-step modulation signal levels and vestigial side band modulation technologies are used, and image signals are compressed according to the MPEG-2 standard, and voice signals are compressed according to the AC-3 standard. 18 signal formats are variously used in such method. Thus, broadcasting of several channels can be transmitted simultaneously.

Meanwhile, due to the development of digital transmission technology, broadcasting communication fusion services for providing broadcasting services and communication services using the same terminal unit have been spotlighted. In the Open Mobile Alliance-BroadCAST (OMA-BCAST) standard, content is provided to a terminal through Internet Protocol (IP)-based packets, and the provided content may be transmitted via a communication net as well as via a broadcasting net.

However, in the case where packets are transmitted via a broadcasting net, positions of packets to be obtained cannot be easily searched. Thus, a conventional apparatus for receiving broadcast data receives all packets and then extracts desired packets from the received packets by using header information of the packets etc. Thus, it is very inconvenient to use the conventional apparatus for receiving broadcast data in a broadcasting system in which the position of desired data must be quickly determined and processed.

In particular, a Service Guide (SG) for providing additional information about broadcasting services such as an electronic program guide (EPG) and an SG announcement for providing metadata about the SG are defined in the OMA-BCAST standard. Packets including an SG announcement and packets including the SG must be sequentially processed so that desired broadcasting services can be effectively provided to users. However, in a conventional broadcasting system in which positions of desired packets cannot be easily determined, it is very inconvenient to provide broadcasting services according to the OMA-BCAST standard to users.

SUMMARY OF THE INVENTION

The present invention provides a method and apparatus for effectively providing Internet Protocol (IP) services in an Advanced Television System Committee (ATSC) transmission system.

According to an aspect of the present invention, there is provided a method of transmitting broadcast data, the method providing a broadcast service by using an IP (Internet Protocol) packet and including: receiving at least one IP packet group, the IP packet group classified based on a service provided by IP packets; generating first mapping information which indicates mapping information between an IP address corresponding to each of the at least one IP packet group and an address within a transmission channel on which each of the at least one IP packet group is to be carried; and transmitting the first mapping information and the at least one IP packet group via the transmission channel.

The transmission channel may be a channel for transmitting data within an Advanced-Vestigial SideBand (A-VSB) system.

The transmission channel may be a data transmission channel for transmitting data, and the at least one IP packet group to be transmitted via the data transmission channel may include at least one of an additional information IP packet group for providing additional information about a broadcast service and a meta data IP packet group for providing meta data about the additional information IP packet group.

The method may further include: generating second mapping information which indicates mapping information between an IP address corresponding to the meta data IP packet group and the data transmission channel on which the meta data IP packet group is to be carried; and transmitting the second mapping information via a signaling information transmission channel for transmitting signaling information required to transmit and receive broadcast data.

The method may further include transmitting first additional information IP packet groups containing additional information about a first broadcast service provided via a first data transmission channel and second additional information IP packet groups containing additional information about a second broadcast service provided via a second data transmission channel together via a combinative and additional information transmission channel for transmitting combinative and additional information about a broadcast service.

The additional information IP packet group may provide a service guide (SG) according to an Open Mobile Alliance-BroadCAST (OMA BCAST) standard, and the meta data IP packet group may provide an SG announcement according to the OMA BCAST standard.

The transmission channel may include at least one sub data channel on which at least one IP packet is to be carried, and the address within the data transmission channel may be a Location Map Table (LMT) index number which indicates a position of a sub data channel on which each of the at least one IP packet group is to be carried.

According to another aspect of the present invention, there is provided a method of receiving broadcast data, the method providing a broadcast service using an IP (Internet Protocol)

packet and including: acquiring first mapping information which indicates mapping information between an IP address corresponding to each of at least one IP packet group classified based on a service provided by IP packets and an address within a transmission channel on which each of the at least one IP packet group is to be carried, from the transmission channel; and selectively acquiring a wanted IP packet group from the at least one IP packet group based on the first mapping information.

The transmission channel may be a channel for transmitting data within an Advanced-Vestigial SideBand (A-VSB) system.

The transmission channel may be a data transmission channel for transmitting data, and the at least one IP packet group to be transmitted via the data transmission channel may include at least one of an additional information IP packet group for providing additional information about a broadcast service and a meta data IP packet group for providing meta data about the additional information IP packet group.

The selective acquiring of the IP packet group may include: acquiring the meta data IP packet group from the data transmission channel using the first mapping information; processing the acquired meta data IP packet group to acquire an IP address corresponding to the additional information IP packet group; and acquiring the additional information IP packet group from the data transmission channel by using the first mapping information and the acquired IP address.

The at least one IP packet group transmitted via the data transmission channel may include at least one data IP packet group for providing a broadcast service, and the selective acquiring of the IP packet group may include: processing the acquired additional information IP packet group to acquire an IP address corresponding to the data IP packet group; and selectively acquiring a wanted data IP packet group from the at least one data IP packet group by using the first mapping information and an IP address corresponding to the data IP packet group.

The method may further include: acquiring second mapping information which indicates mapping information between an IP address corresponding to the meta data IP packet group and the data transmission channel, from a signaling transmission channel for transmitting signaling information which is information required to transmit and receive broadcast data; and accessing the data transmission channel on which the meta data IP packet group is carried based on the second mapping information, wherein the acquiring of the first mapping information includes acquiring the first mapping information from a predetermined position of the accessed data transmission channel.

The additional information IP packet group may provide an SG according to an Open Mobile Alliance-BroadCAST (OMA BCAST) standard, and the meta data IP packet group may provide an SG announcement according to the OMA BCAST standard.

The transmission channel may be a combinative and additional information transmission channel for transmitting combinative and additional information about a broadcast service, and the at least one IP packet group to be transmitted via the combinative and additional information transmission channel may include first additional information IP packet groups containing additional information about a first broadcast service provided via a first data transmission channel and second additional information IP packet groups containing additional information about a second broadcast service provided via a second data transmission channel.

The transmission channel may include at least one sub data channel on which at least one IP packet is carried, and the address within the data transmission channel may be an LMT index number which indicates a position of a sub data channel on which each of the at least one IP packet group is to be carried.

According to another aspect of the present invention, there is provided an apparatus for transmitting broadcast data, the apparatus providing a broadcast service using an IP (Internet Protocol) packet and including: a receiving unit which receives at least one IP packet group, the IP packet group classified based on a service provided by IP packets; a first mapping information generating unit which generates first mapping information which indicates mapping information between an IP address corresponding to each of the at least one IP packet group and an address within a transmission channel on which each of the at least one IP packet group is to be carried; and a transmission unit transmitting the first mapping information and the at least one IP packet group via the transmission channel.

According to another aspect of the present invention, there is provided an apparatus for receiving broadcast data, the apparatus providing a broadcast service using an IP (Internet Protocol) packet and including: a first mapping information acquiring unit which acquires first mapping information which indicates mapping information between an IP address corresponding to each of at least one IP packet group classified based on a service provided by IP packets and an address within a transmission channel on which each of the at least one IP packet group is to be carried, from the transmission channel; and an IP packet group acquiring unit which selectively acquires a wanted IP packet group from the at least one IP packet group based on the first mapping information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
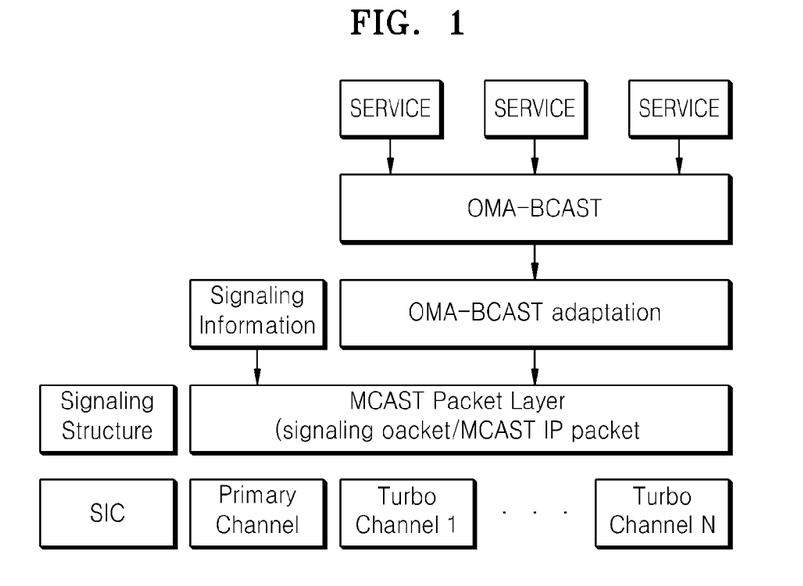
FIG. 1 illustrates a protocol stack of an Advanced-Vestigial SideBand (A-VSB) transmission system for providing an Internet Protocol (IP) service according to an exemplary embodiment of the present invention.

FIG. 1 illustrates a protocol stack of an A-VSB transmission system for providing a broadcast service by using Internet Protocol (IP) packets according to an embodiment of the present invention.

In FIG. 1, a broadcast service is provided by using IP packets that are packetized according to the Open Mobile Alliance-BroadCAST (OMA-BCAST) standard.

IP packets according to the OMA-BCAST standard are generated using data for providing a broadcast service. The generated IP packets are grouped according to services. A service comprises at least one service component. As a simple example, an audio/video (A/V) service comprises an audio service and a video service. In this case, the generated IP packets may be grouped into a first IP packet group for providing an audio service and a second IP packet group for providing a video service. Each IP packet group has a corresponding IP address. In other words, destination IP addresses or source IP addresses of the IP packets that belong to the same IP packet group are the same. In the present specification, the IP packet group means at least one continuous packet and may be used to mean an IP stream or an IP virtual channel etc. according to embodiments of the present invention.

Formats of IP packets are different from those of transmission packets stipulated in Advanced VSB Mobile Broadcasting (A-VSB MCAST) (hereinafter, referred to as MCAST). Thus, in a packet layer, IP packets are adjusted to be used in an MCAST system and a header is added to these IP packets. In addition, in the packet layer, signaling information is packetized separately from the IP packets. The signaling information comprises information required to transmit and receive data.

The IP packets are transmitted while being carried on an MCAST transmission channel. The MCAST transmission channel comprises sub data channels for transmitting at least one IP packet, and the IP packet groups are transmitted while being carried on sub data channels. Each transmission channel comprises sub data channels for transmitting signaling information. An IP mapping table (hereinafter, referred to as an IMT) that will be described later exists in a sub data channel for transmitting signaling information, and only sub data channels on which desired IP packet groups are carried may be sorted using an IMT and may be processed. A method of processing desired IP packet groups using an IMT will be described in detail with reference to FIGS. 3 through 5.

The MCAST system separately comprises transmission channels for transmitting signaling information required to transmit and receive broadcasting data. In the present specification, a transmission channel for transmitting signaling information is referred to as a signaling information channel (SIC). Essential information for processing the other transmission channels is contained in the SIC.

The SIC contains detailed information about transmission channels, and examples of the information comprise an IMT, position information of transmission channels within a transmission frame, time slicing information, and decoding information about each transmission channel. Hereinafter, an IMT that exists in an SIC is referred to as an i-IMT, so as to be distinguished from an IMT that exists in other transmission channels.

Figure 2:
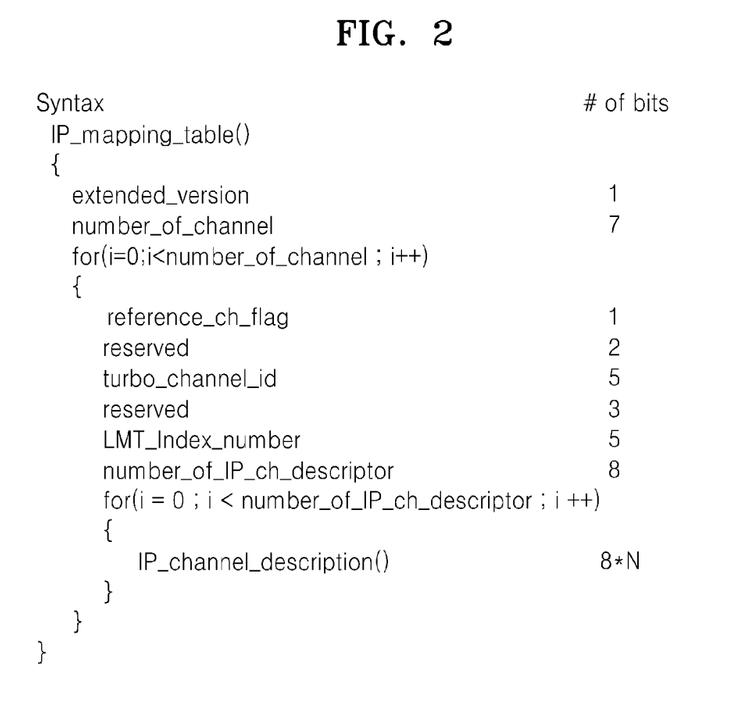
FIG. 2 illustrates the syntax of an IP mapping table (IMT) according to an exemplary embodiment of the present invention.

FIG. 2 illustrates the syntax of an IMT according to an embodiment of the present invention.

extended_version indicates whether IP_mapping_table( ) is updated or not. If the value of extended-version is '0', it means that IP_mapping_table( ) is not updated.

number_of_channel indicates the number of transmission channels. Meta data IP packet groups that will be described later are contained in each transmission channel. Thus, the number of meta data IP packet groups is the same as or greater than the number of transmission channels.

reference_ch_flag indicates whether a corresponding transmission channel is a combinative and additional information transmission channel for transmitting combinative and additional information about a broadcast service or not. If the value of reference_ch_flag is '1', the corresponding transmission channel is a combinative and additional information transmission channel. As an example, only part of electronic service guide (ESG) information is carried on a general transmission channel. However, all ESG information transmitted may be contained in the combinative and additional information transmission channel. In this way, the combinative and additional information transmission channel is a reference channel for other transmission channels.

reserved is a region that is reserved for the case where a change in syntax occurs.

turbo_channel_id is an identifier for identifying a transmission channel.

LMT_Index_number indicates positions of sub data channels on which IP packet groups are carried. A Location Map Table (LMT) index number is allocated to each of the sub data channels. Since the value of LMT_Index_number means an LMT index number, the positions of sub data channels on which the IP packet groups are carried can be determined using the value of LMT_Index_number.

number_of_IP_ch_descriptor indicates the number of IP_channel_descriptor ( ). This is the same as the number of the IP packet groups carried on the transmission channel.

IP_channel_descriptor ( ) contains additional descriptions of the IP packet groups. IP_channel_descriptor ( ) provides a simple description of IP address tables corresponding to IP packet groups, MAC address tables corresponding to the IP packet groups, and the IP packet groups. One of IP addresses according to the IPv4 standard and the IPv6 standard may be used as the IP addresses used in the IP address tables.

Figure 3:
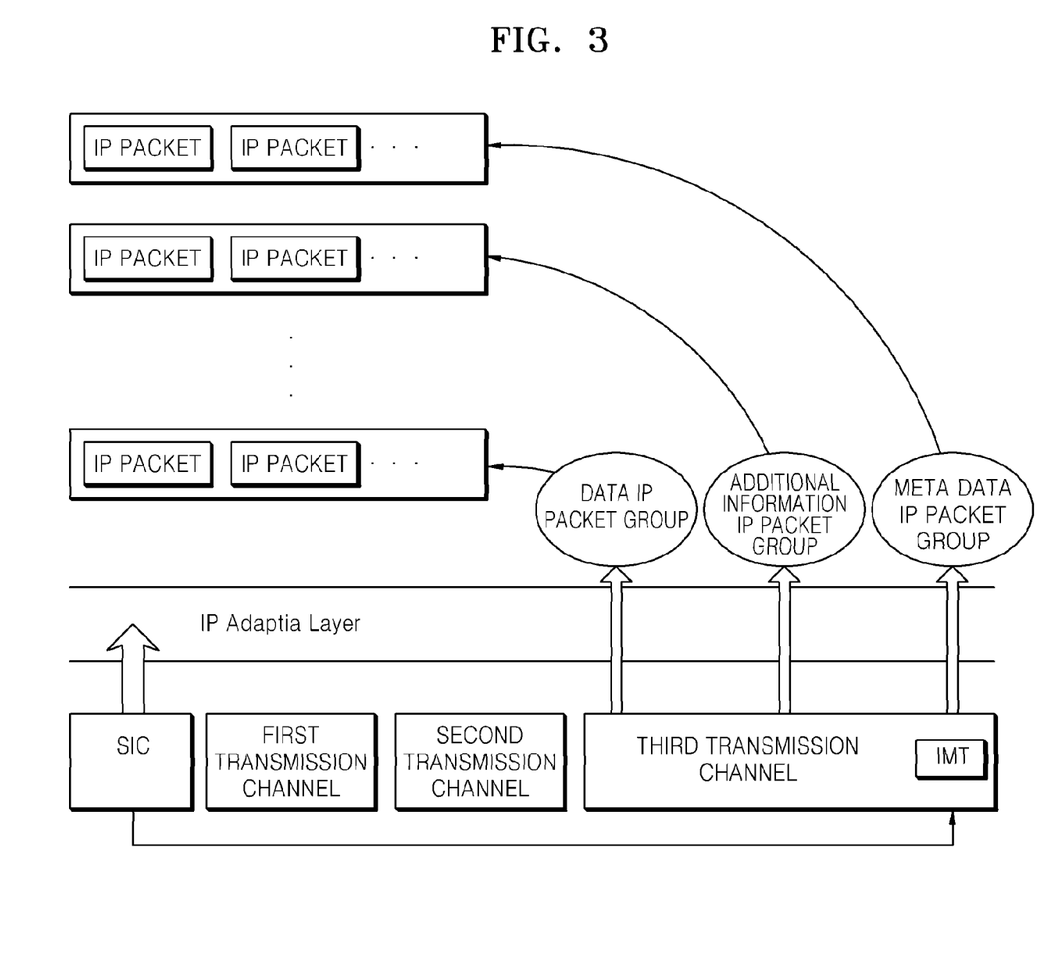
FIG. 3 illustrates a method of providing a broadcast service according to an exemplary embodiment of the present invention.

FIG. 3 illustrates a method of providing a broadcast service according to an embodiment of the present invention. In FIG. 3, the IP packet groups are classified into data IP packet groups, additional information IP packet groups, and meta data IP packet groups. The data IP packet groups are a set of IP packets including data for providing a broadcast service. The additional information IP packet group is a set of IP packets for providing additional information about the broadcast service. In addition, the meta data IP packet group is a set of IP packets for providing meta data about the additional information IP packet group.

An apparatus for receiving broadcast data first accesses an SIC. The SIC contains an i-IMT, and an IP address corresponding to each meta data IP packet group, information about which meta data IP packet group is carried in which transmission channel, and information about each meta data IP packet group etc. are contained in the i-IMT. The following Table 1 is a table for illustrating information extracted from the i-IMT.

TABLE 1

| IP address | Identifier of Transmission Channel | Simple Description |
| --- | --- | --- |
| 1.1.1.1 | 1 | kbs1, Monday broadcast composition table |
| 1.1.2.1 | 2 | kbs1, Tuesday broadcast composition table |
| 1.1.3.1 | 3 | kbs2, Monday broadcast composition table |
| 1.1.4.1 | 4 | kbs3, Monday broadcast composition table |

Referring to Table 1, there are four meta data IP packet groups. The meta data IP packet group carried on a first transmission channel contains composition information about broadcasting provided via a kbs1 base station on Mondays, and the meta data IP packet group carried on a second transmission channel contains composition information about broadcasting provided via a kbs1 base station on Tuesdays.

The apparatus for receiving broadcast data displays a simple description of each meta data IP packet group to aid a user's selection. If a user selects a predetermined meta data IP packet group, the apparatus for receiving broadcast data accesses a transmission channel containing the user-selected meta data IP packet group by referring to an i-IMT. Hereinafter, the case where composition information about a broadcast provided to a user via a kbs2 base station on Mondays is assumed. Referring to Table 1, an IP address corresponding to the meta data IP packet group selected by the user is 1.1.3.1, and the meta data IP packet group selected by the user is carried on a third transmission channel.

The apparatus for receiving broadcast data accesses the third transmission channel to acquire an IMT. The IMT is carried on a sub data channel for transmitting signaling information within the third transmission channel. The IMT contains information about an actual position where all IP packet groups that exist in the third transmission channel are carried. The following Table 2 is a table for illustrating information extracted from the IMT.

TABLE 2

| IP Address | IMT Index Number |
| --- | --- |
| 1.1.3.1 | 5 |
| 1.1.3.2 | 6 |
| 1.1.3.3 | 7 |
| 1.1.3.4 | 8 |
| 1.1.3.5 | 9 |
| 1.1.3.6 | 10 |
| 1.1.3.7 | 11 |
| 1.1.3.8 | 12 |
| 1.1.3.9 | 13 |

The apparatus for receiving broadcast data determines from the i-IMT that an IP address corresponding to a meta data IP packet group selected by a user is '1.1.3.1'. Referring to Table 2, the IP packet group having an IP address '1.1.3.1' is carried on a sub data channel having an LMT index number '5'. The apparatus for receiving broadcast data accesses a sub data channel having an LMT index number (labeled IMT Index Number in Table 2) '5' to process IP packets.

Meanwhile, the meta data IP packet group provides meta data about additional information IP packet groups. In other words, the meta data IP packet group contains information about IP addresses corresponding to the additional information IP packet groups. The apparatus for receiving broadcast data processes IP packets contained in the meta data IP packet group to acquire IP addresses corresponding to the additional information IP packet groups. It is assumed that the IP addresses corresponding to the additional information IP packet groups are '1.1.3.2', '1.1.3.3.', and '1.1.3.4'.

The apparatus for receiving broadcast data accesses sub data channels on which the additional information IP packet groups are carried, to acquire IP packets using an IMT. Referring to Table 2, the additional information IP packet groups are carried on sub data channels having LMT index numbers '6', '7', and '8'. The apparatus for receiving broadcast data accesses sub data channels having LMT index numbers '6', '7', and '8' to process IP packets. The additional information IP packet groups contain IP addresses of data IP packet groups for providing broadcast services.

The apparatus for receiving broadcast data processes the additional information IP packet groups to combine broadcast composition information provided by a kbs2 base station on Mondays. The combined broadcast composition information is displayed to aid a user's selection. If the user selects a broadcast service to be provided, the apparatus for receiving broadcast data accesses sub data channels on which corresponding data IP packet groups are carried, by using the IP addresses extracted from the additional information IP packet groups and the IMT. Subsequently, the IP packets carried on the corresponding sub data channels are processed to provide a broadcast service to the user.

According to the present invention, only desired IP packets are selectively extracted and processed, and in particular, a broadcast service according to the OMA-BCAST standard can be provided.

Figure 4:
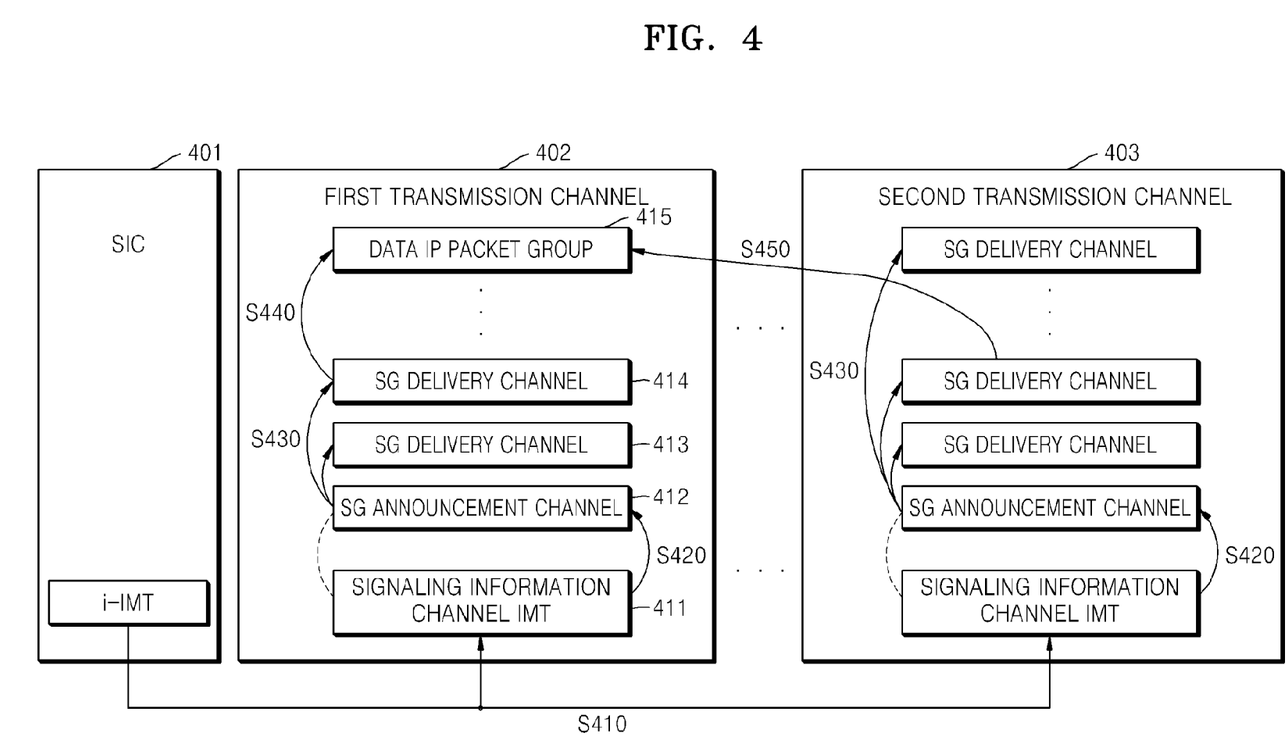
FIG. 4 illustrates a method of providing a broadcast service based on the Open Mobile Alliance-BroadCAST (OMA-BCAST) standard according to an exemplary embodiment of the present invention.

FIG. 4 illustrates a method of providing a broadcast service based on the OMA-BCAST standard according to an embodiment of the present invention.

Figure 5:
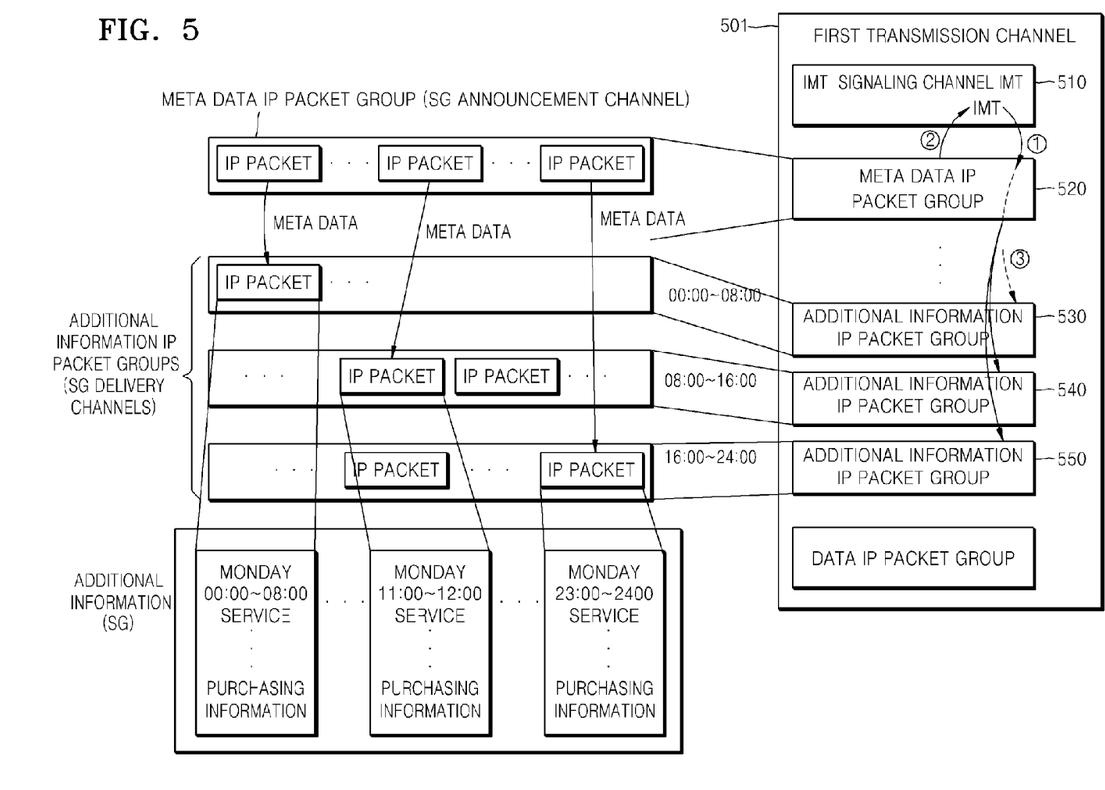
FIG. 5 illustrates acquisition of a service guide (SG) based on the OMA-BCAST standard according to an exemplary embodiment of the present invention.

In FIGS. 4 and 5, a service guide delivery channel (hereinafter, referred to as an SG delivery channel) corresponds to an additional information IP packet group, and a service guide announcement channel (hereinafter, referred to as an SG announcement channel) corresponds to a meta data IP packet group.

In operation S410, an apparatus for receiving broadcast data accesses an SIC 401 to acquire an i-IMT. Then, the apparatus for receiving broadcast data accesses a transmission channel on which an SG announcement channel to be acquired is carried, by using the i-IMT.

It is assumed that the SG announcement channel to be acquired is carried on a first transmission channel 402 which is a data transmission channel for transmitting data.

In operation S420, the apparatus for receiving broadcast data accesses the first transmission channel 402 to acquire an IMT from a sub data channel 411 on which signaling information is carried. After the apparatus for receiving broadcast data accesses the sub data channel 412 on which the SG announcement channel is carried, the apparatus processes the carried IP packets by using the acquired IMT. If the IP packets are processed, IP addresses corresponding to SG delivery channels are acquired.

In operation S430, the apparatus for receiving broadcast data accesses sub data channels 413 and 414 on which the SG delivery channels are carried, and processes IP packets by using the acquired IP addresses and the IMT. If the sub data channels 413 and 414 are processed, IP addresses corresponding to data IP packet groups for providing a broadcast service are acquired.

In operation S440, the apparatus for receiving broadcast data accesses the sub data channel 415 on which a desired data IP packet group is carried, and processes IP packets by using the acquired IP addresses and the IMT so as to provide a broadcast service.

Now, the case where the SG announcement channel to be acquired is carried on the second transmission channel 403 which is a combinative and additional information transmission channel for transmitting combinative and additional information about a broadcast service will be described. It is assumed that broadcast composition information for one day is carried on each transmission channel. If a user requests broadcast composition information for one week, the apparatus for receiving broadcast data must access each channel, acquire broadcast composition information for each day and then combine broadcast composition information for one week. In order to prevent such an inconvenience, broadcast composition information for one week, which is carried on other channels, is carried on a combinative and additional information transmission channel. Thus, if the user requests broadcast composition information for one week, the apparatus for receiving broadcast data accesses the combinative and additional information transmission channel to acquire broadcast composition information for one week.

Operations S410 through S430 are as mentioned above, and thus a repeated description thereof will be omitted here.

In operation S450, the apparatus for receiving broadcast data accesses the sub data channel 415 on which desired data IP packet groups are carried, using the IMT and the IP addresses acquired by processing the SG delivery channel. Meanwhile, data IP packet groups may not be contained in the combinative and additional information transmission channel 403. In this case, the sub data channel 415 on which the data IP packet groups are carried, may be contained in other data transmission channels. Thus, the apparatus for receiving broadcast data may access other data transmission channels to process the data IP packet groups.

FIG. 5 illustrates acquisition of an SG based on the OMA-BCAST standard according to an embodiment of the present invention.

It is assumed that a user wants to see one day of broadcast composition information. The broadcast composition information to be provided to the user is carried on the first transmission channel 501 and is transmitted.

The apparatus for receiving broadcast data acquires an IMT from a sub data channel 510 for transmitting signaling information of the first transmission channel 501. The apparatus for receiving broadcast data accesses a sub data channel 520 on which an SG announcement channel is carried, by using the IMT. IP packets within the sub data channel 520 provide meta data about the SG delivery channel. The IP packets within the sub data channel 520 are processed, and IP addresses corresponding to SG delivery channels are acquired.

The apparatus for receiving broadcast data accesses sub data channels 530, 540, and 550 on which SG delivery channels are carried, using the IMT and the IP addresses. The sub data channel 530 provides broadcast composition information of a time period from 00:00 to 08:00, the sub data channel 540 provides broadcast composition information of a time period from 08:00 to 16:00, and the sub data channel 550 provides broadcast composition information of a time period from 16:00 to 24:00.

The apparatus for receiving broadcast data processes the sub data channels 530, 540, and 550, and acquires broadcast composition information for one day by combining the sub data channels 530, 540, and 550.

Figure 6:
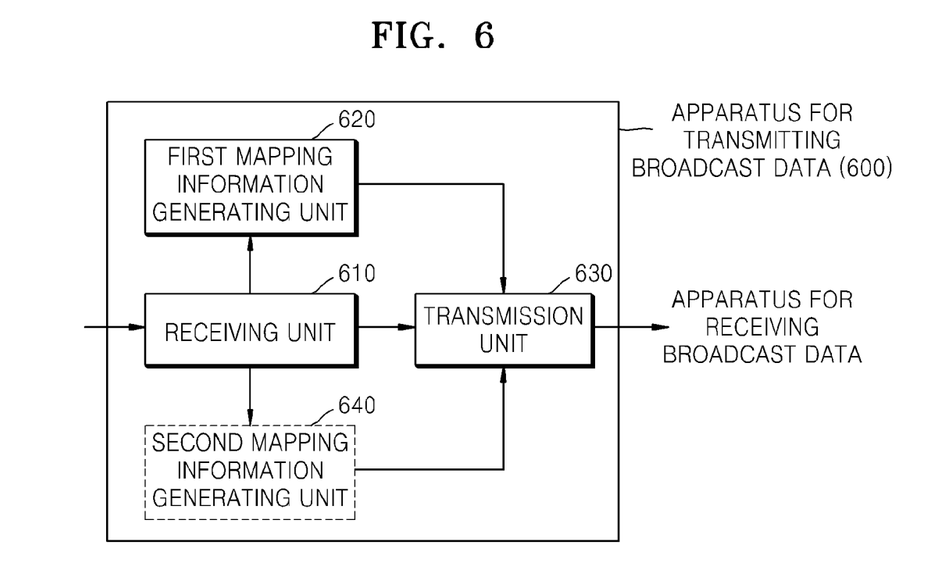
FIG. 6 illustrates an apparatus for transmitting broadcast data according to an exemplary embodiment of the present invention.

FIG. 6 illustrates an apparatus for transmitting broadcast data according to an embodiment of the present invention.

Referring to FIG. 6, an apparatus 600 for transmitting broadcast data comprises a receiving unit 610, a first mapping information generating unit 620, and a transmission unit 630. The apparatus 600 for transmitting broadcast data provides a broadcast service by using an IP packet.

The receiving unit 610 receives at least one IP packet group. The at least one IP packet group may be classified based on services provided by IP packets. The IP packets that belong to the same IP packet group have the same destination (or place of dispatch). IP packet groups comprise data IP packet groups for providing a broadcast service, additional information IP packet groups for providing additional information about a broadcast service, and meta data IP packet groups for providing meta data about the additional information IP packet groups. IP packets may be packets for ensuring adherence to the OMA BCAST standard, the additional information IP packet groups provide an SG based on the OMA BCAST standard, and the meta data IP packet group may provide an SG announcement based on the OMA BCAST standard.

The first mapping information generating unit 620 generates first mapping information which indicates mapping information between an IP address corresponding to each of at least one IP packet group and an address within a transmission channel on which each of at least one IP packet group is to be carried. When the apparatus 600 for transmitting broadcast data transmits the first mapping information via an A-VSB transmission system, a transmission channel comprises at least one sub data channel on which at least one IP packet is to be carried. Each IP packet group is carried on a sub data channel and is transmitted. An LMT index number is information which indicates the position of a sub data channel, and an address within the transmission channel on which an IP packet group is to be carried is provided using an LMT index number. In the A-VSB transmission system, the first mapping information is information which indicates which IP packet group is to be carried on which sub data channel.

The transmission unit 630 transmits the first mapping information and at least one IP packet group via the transmission channel. In the A-VSB system, the transmission channel is a turbo channel. The transmission channel is classified into a data transmission channel for transmitting data, a signaling information transmission channel for transmitting signaling information containing second mapping information that will be described later, and a combinative and additional information transmission channel for transmitting combinative and additional information about a broadcast service. The transmission unit 630 may transmit the first mapping information, a meta data IP packet group, and at least one additional information IP packet group via the data transmission channel.

The apparatus 600 for transmitting broadcast data may further include a second mapping information generating unit 640. The second mapping information generating unit 640 generates second mapping information which indicates mapping information between an IP address corresponding to a meta data IP packet group and the data transmission channel. In other words, the second mapping information is information indicating which meta data IP packet group is carried on which transmission channel.

If the second mapping information is generated, the transmission unit 630 transmits the second mapping information via a signaling information transmission channel. The signaling information transmission channel is a channel for transmitting signaling information which is information required to transmit and receive a broadcast data.

The transmission unit 630 may transmit combinative and additional information about a broadcast service via a combinative and additional information transmission channel. The combinative and additional information channel transmits additional information IP packet groups contained in two or more transmission channels via one channel. As an example, first additional information IP packet groups and second additional information IP packet groups are transmitted together via the additional information transmission channel. In this case, the first additional information IP packet groups contain additional information about a first broadcast service provided via a first data transmission channel, and the second additional information IP packet groups contain additional information about a second broadcast service provided via a second data transmission channel.

Figure 7:
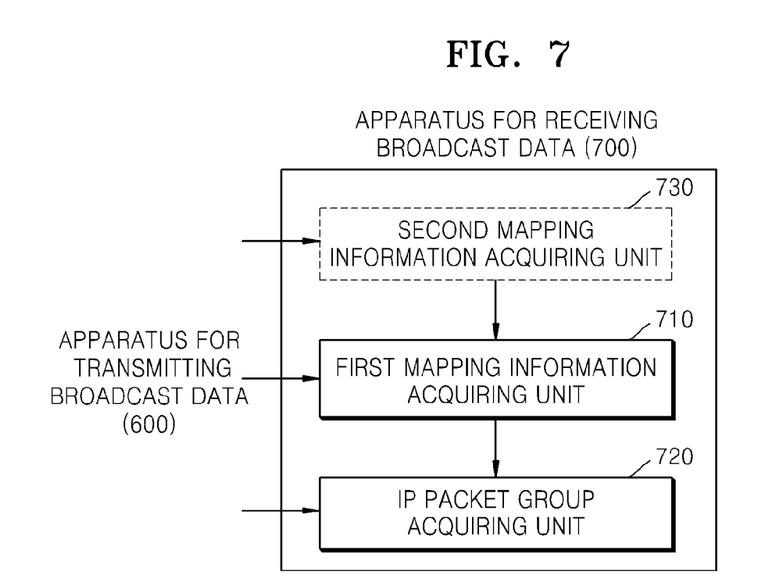
FIG. 7 illustrates an apparatus for receiving broadcast data according to an exemplary embodiment of the present invention.

FIG. 7 illustrates an apparatus 700 for receiving broadcast data according to an embodiment of the present invention.

Referring to FIG. 7, the apparatus 700 for receiving broadcast data comprises a first mapping information acquiring unit 710 and an IP packet group acquiring unit 720.

The first mapping information acquiring unit 710 acquires first mapping information which indicates mapping information between an IP address corresponding to each of at least one IP packet group and an address within a transmission channel on which each of at least one IP packet group is to be carried, from the transmission channel.

When the transmission channel is a channel for transmitting data within an A-VSB transmission system, the transmission channel contains at least one sub data channel on which at least one packet is carried. In this case, the first mapping information may be carried on a sub data channel for transmitting signaling information and may be transmitted. The first mapping information contains information about whether each IP packet group is carried on which sub data channel.

The IP packet group acquiring unit 720 acquires only IP packet groups from at least one IP packet group transmitted via the transmission channel, based on the first mapping information. The at least one IP packet group may contain at least one of data IP packet group for providing a broadcast service, an additional information IP packet group for providing additional information about a broadcast service, and a meta data IP packet group for providing meta data about the additional information IP packet group. In order to provide a desired broadcast service to a user, the IP packet group acquiring unit 720 must acquire the meta data IP packet group and the additional information IP packet group sequentially. The detailed configuration of the IP packet group acquiring unit 720 will be described later with reference to FIG. 8.

The additional information IP packet group in the present specification may be an SG delivery channel for providing an SG based on the OMA BCAST standard. The SG delivery channel is a virtual channel which indicates a set of IP packets for providing an SG. In addition, the meta data IP packet group may be an SG announcement channel for providing an SG announcement based on the OMA BCAST standard. The SG announcement channel is a virtual channel which indicates a set of IP packets for providing an SG announcement.

The apparatus 700 for receiving broadcast data may further include a second mapping information acquiring unit 730. The second mapping information acquiring unit 730 acquires second mapping information from a signaling information transmission channel. The signaling information transmission channel transmits signaling information which is information required to transmit and receive broadcast data. The second mapping information indicates mapping information between an IP address corresponding to the meta data IP packet group and a data transmission channel. In other words, the second mapping information contains information about which meta data IP packet group is carried on which transmission channel.

The first mapping information acquiring unit 710 searches the data transmission channel on which the meta data IP packet group requested by the user is carried, based on the second mapping information acquired by the second mapping information acquiring unit 730. Subsequently, the first mapping information is acquired from a sub data channel for transmitting signaling information.

Figure 8:
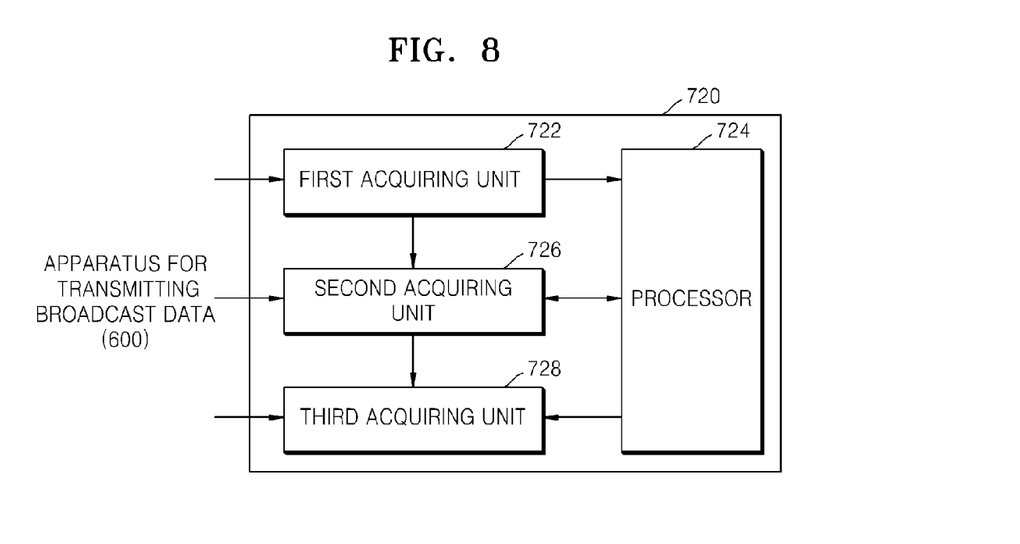
FIG. 8 illustrates the detailed configuration of an IP packet group acquiring unit of FIG. 7 according to an exemplary embodiment of the present invention.

FIG. 8 illustrates the detailed configuration of the IP packet group acquiring unit 720 of FIG. 7 according to an embodiment of the present invention.

The IP packet group acquiring unit 720 may comprise a first acquiring unit 722, a processor 724, a second acquiring unit 726, and a third acquiring unit 728.

The first acquiring unit 722 acquires a meta data IP packet group by using first mapping information.

The processor 724 processes the acquired meta data IP packet group to acquire an IP address corresponding to an additional information IP packet group.

The second acquiring unit 726 acquires the additional information IP packet group by using the first mapping information and the acquired IP address.

The processor 724 processes the acquired additional information IP packet group to further acquire an IP address corresponding to a data IP packet group.

The third acquiring unit 728 acquires a data IP packet group requested by the user by using the first mapping information and the IP address corresponding to the data IP packet group.

When the user requests combinative and additional information about a broadcast service, the first mapping information acquiring unit 710 accesses a combinative and additional information transmission channel by using the second mapping information and acquires first mapping information from a predetermined position of a combinative and additional information transmission channel.

The combinative and additional information transmission channel is a channel for transmitting combinative and additional information about a broadcast service. A first additional information IP packet group and a second additional information IP packet group are carried on the combinative and additional information transmission channel. The first additional information IP packet group contains additional information about a first broadcast service provided via a first data transmission channel, and the second additional information IP packet group contains additional information about second broadcast services provided via a second data transmission channel.

In addition, the data IP packet group may not be carried on the combinative and additional information transmission channel. In this case, the third acquiring unit 728 must access other channels and acquire the data IP packet group by using the first mapping information and an IP address corresponding to the data IP packet group.

Figure 9:
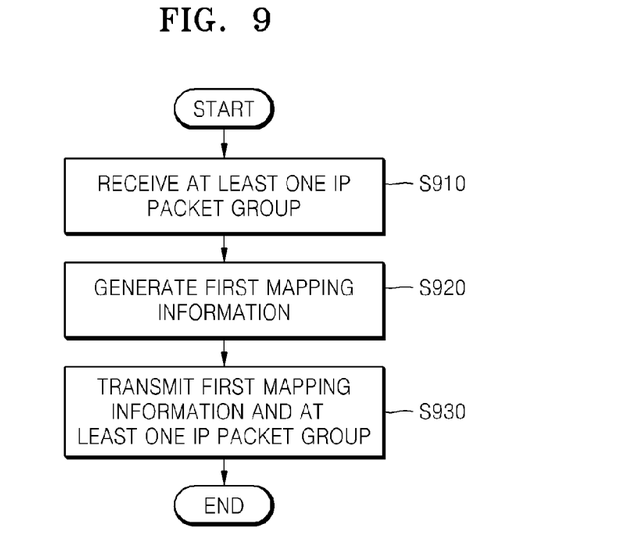
FIG. 9 is a flowchart illustrating a method of transmitting broadcast data according to an exemplary embodiment of the present invention.

FIG. 9 is a flowchart illustrating a method of transmitting broadcast data according to an embodiment of the present invention.

In operation S910, at least one IP packet group is received. IP packet groups are classified based on services provided by IP packets, and at least one IP packet group is carried on a transmission channel and is transmitted.

In operation S920, first mapping information is generated. The first mapping information indicates mapping information between an IP address corresponding to each of at least one IP packet group and an address within a transmission channel on which each of at least one IP packet group is to be carried. In other words, the first mapping information contains information about a position where an IP packet group is carried within the transmission channel.

In operation S930, the first mapping information and at least one IP packet group are transmitted via a transmission channel. According to the present invention, in order to provide a broadcast service according to the OMA BCAST standard, at least one of an additional information IP packet group for providing additional information about a broadcast service and a meta data IP packet group for providing meta data about the additional information IP packet group is transmitted.

Figure 10:
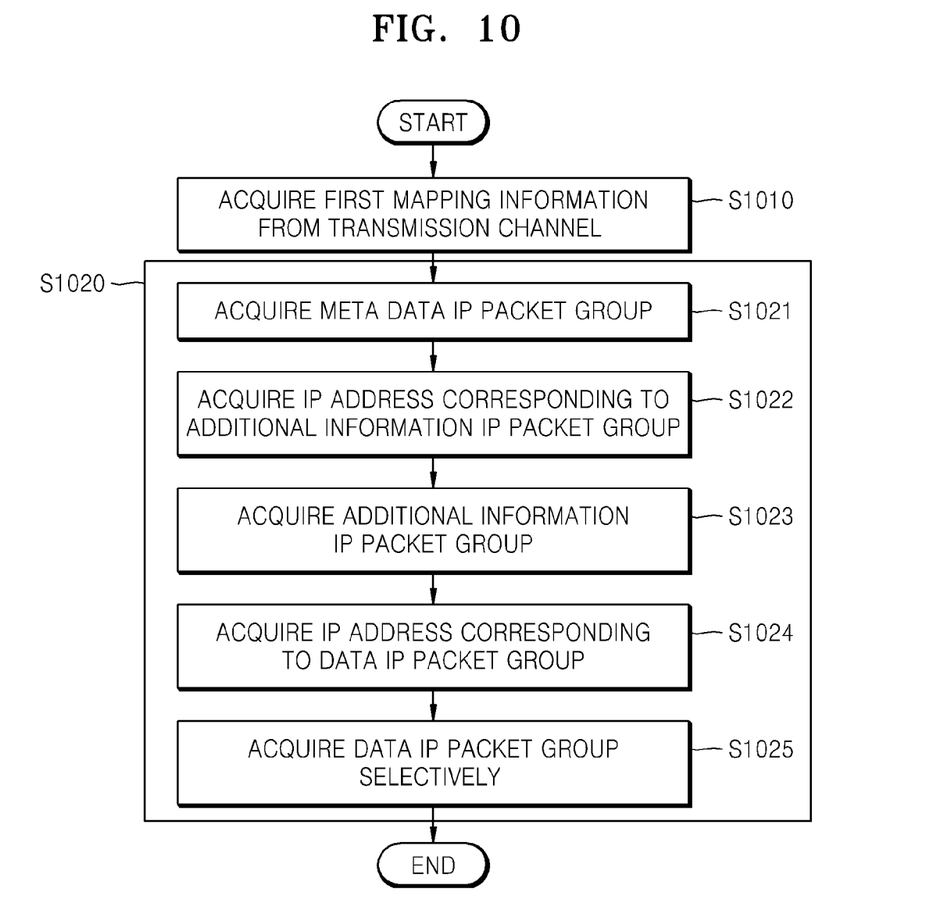
FIG. 10 is a flowchart illustrating a method of receiving broadcast data according to an exemplary embodiment of the present invention.

FIG. 10 is a flowchart illustrating a method of receiving broadcast data according to an embodiment of the present invention.

In operation S1010, first mapping information is acquired from a transmission channel. In order to acquire the first mapping information, second mapping information may be acquired first. The second mapping information indicates mapping information between an IP address corresponding to a meta data IP packet group and a data transmission channel. In other words, the second mapping information contains information about which meta data IP packet group is carried on which transmission channel. The second mapping information may be acquired via a signaling transmission channel.

In operation S1020, an IP packet group to be acquired of at least one IP packet group is selectively acquired from the transmission channel based on the first mapping information.

Operation S1020 may be performed by operations S1021 through S1025.

In operation S1021, a meta data IP packet group is acquired from the data transmission channel by using the first mapping information.

In operation S1022, the acquired meta data IP packet group is processed to acquire an IP address corresponding to an additional information IP packet group.

In operation S1023, the additional information IP packet group is acquired from the data transmission channel by using the first mapping information and the acquired IP address.

In operation S1024, the acquired additional information IP packet group is processed to acquire an IP address corresponding to a data IP packet group. At least one data IP packet may be carried on the data transmission channel.

In operation S1025, a data IP packet group is selectively acquired from at least one data IP packet group.

In the present specification, the present invention is implemented using the A-VSB transmission system. However, the present invention may be implemented using any transmission system defined by the ATSC according to embodiments of the present invention.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The present invention can also be embodied as computer readable codes on a computer readable transmission medium. An example of the computer readable transmission medium is carrier waves (such as data transmission through the Internet). The computer readable recording medium can also be distributed over network coupled computer systems so that the computer readable code is stored and executed in a distributed fashion.

In the method and apparatus for transmitting broadcast data and the method and apparatus for receiving broadcast data according to exemplary embodiments of the present invention, first mapping information is provided, and a user can access only desired IP packets quickly and process them so that a data processing speed can be improved.

In addition, a broadcast service according to the OMA-BCAST standard is provided so that the range in which an A-VSB transmission system is utilized can be widened.

Furthermore, combinative and additional information is provided so that the combinative and additional information can be effectively transmitted to the user.

Furthermore, first mapping information and second mapping information are used so that an SG according to the OMA-BCAST standard can be effectively acquired.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting broadcast data via an Internet Protocol (IP) packet, the method comprising:
receiving at least one IP packet to be included in an IP packet group;
generating first mapping information which comprises mapping information between an IP address corresponding to an IP packet group in which the at least one IP packet is included and a transmission channel on which the IP packet group is to be carried and additional descriptive information relating to the IP packet group; and
transmitting the first mapping information and the IP packet group,
wherein the first mapping information is transmitted via an information channel, and the first mapping information further comprises information indicating a total number of transmission channels and information indicating a transmission channel on which information on an access to a service guide regarding a broadcast service provided via the IP packet is to be transmitted,
wherein the information on an access to a service guide regarding a broadcast service provided via the IP packet is to be transmitted comprises an IP address of an IP packet group corresponding to a service guide announcement channel on which the access to the service guide is to be transmitted.

2. The method of claim 1, wherein the transmitting of the first mapping information and the IP packet group comprises transmitting the IP packet group via a data transmission channel.

3. The method of claim 2, wherein the first mapping information further comprises a number of a version that indicates whether at least one signaling information is changed or not.

4. The method of claim 1, wherein the first mapping information further comprises a channel identifier for identifying the transmission channel.

5. An apparatus for transmitting broadcast data via an Internet Protocol (IP) packet, the apparatus comprising:
- a receiving unit receiving at least one IP packet to be included in an IP packet group;
- a generator generating first mapping information which comprises mapping information between an IP address corresponding an IP packet group in which the at least one IP packet is included and a transmission channel on which the IP packet group is to be carried and additional descriptive information relating to the IP packet group; and
- a transmitter transmitting the first mapping information and the IP packet group,
- wherein the first mapping information is transmitted via an information channel, and the first mapping information further comprises information indicating a total number of transmission channels and information indicating a transmission channel on which information on an access to a service guide regarding a broadcast service provided via the IP packet is to be transmitted,
- wherein the information on an access to a service guide regarding a broadcast service provided via the IP packet is to be transmitted comprises an IP address of an IP packet group corresponding to a service guide announcement channel on which the access to the service guide is to be transmitted.

6. The apparatus of claim 5, wherein the transmitter transmits the IP packet group via a data transmission channel.

7. The apparatus of claim 5, wherein the first mapping information further comprises a number of versions that indicates whether at least one signaling information is changed or not.

8. The apparatus of claim 5, wherein the first mapping information further comprises a channel identifier for identifying the transmission channel.

* * * * *